United States Patent
Kishimoto et al.

(10) Patent No.: US 11,693,451 B2
(45) Date of Patent: Jul. 4, 2023

(54) DIGITIZER AND DISPLAY DEVICE INCLUDING THE SAME

(71) Applicant: Samsung Display Co., Ltd., Yongin-Si (KR)

(72) Inventors: Hirotsugu Kishimoto, Hwaseong-si (KR); Dasom Gu, Asan-si (KR); Yongchan Jeon, Cheonan-si (KR); Sung-Ki Jung, Asan-si (KR); Seungkyun Hong, Cheonan-si (KR); Hyun-Been Hwang, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/474,276

(22) Filed: Sep. 14, 2021

(65) Prior Publication Data
US 2022/0229470 A1 Jul. 21, 2022

(30) Foreign Application Priority Data

Jan. 19, 2021 (KR) .................. 10-2021-0007639
Mar. 30, 2021 (KR) .................. 10-2021-0041161

(51) Int. Cl.
*G06F 1/16* (2006.01)
*H04M 1/02* (2006.01)

(52) U.S. Cl.
CPC ........ *G06F 1/1643* (2013.01); *H04M 1/0214* (2013.01); *H04M 1/0266* (2013.01)

(58) Field of Classification Search
CPC .. G06F 1/1643; G06F 1/1652; H04M 1/0214; H04M 1/0266; H04M 1/0268
See application file for complete search history.

(56) References Cited

U.S. PATENT DOCUMENTS

| | | | |
|---|---|---|---|
| 9,467,190 B1 * | 10/2016 | Cramer | H01L 27/153 |
| 10,324,577 B2 | 6/2019 | Sainis et al. | |
| 10,684,650 B2 | 6/2020 | Sim et al. | |
| 10,824,840 B2 | 11/2020 | Song et al. | |
| 11,392,180 B1 * | 7/2022 | Yates | G06F 1/1652 |
| 11,423,843 B2 * | 8/2022 | Kim | G09G 3/3233 |
| 11,423,846 B2 * | 8/2022 | Yoon | G09G 3/3266 |
| 11,425,819 B2 * | 8/2022 | Kim | H05K 5/0017 |

(Continued)

FOREIGN PATENT DOCUMENTS

| | | |
|---|---|---|
| KR | 1020180127705 A | 11/2018 |
| KR | 1020180130151 A | 12/2018 |
| KR | 102125480 B1 | 6/2020 |

*Primary Examiner* — Benyam Ketema
(74) *Attorney, Agent, or Firm* — Cantor Colburn LLP

(57) ABSTRACT

A digitizer includes a folding area a non-folding area. The digitizer includes a first base layer, a second base layer disposed on the first base layer, a third base layer disposed on the second base layer, a first sensing line disposed between the first base layer and the second base layer, and a second sensing line substantially perpendicular to the first sensing line, disposed between the second base layer and the third base layer, and including a first sub-line portion and a second sub-line portion disposed in the non-folding area, and a third sub-line portion disposed between the first sub-line portion and the second sub-line portion and corresponding to the folding area. The third sub-line portion has a fracture strain greater than a fracture strain of the first sub-line portion and the second sub-line portion.

20 Claims, 10 Drawing Sheets

(56) References Cited

U.S. PATENT DOCUMENTS

| | | | |
|---|---|---|---|
| 2010/0002402 A1* | 1/2010 | Rogers | H05K 1/111 361/749 |
| 2012/0043858 A1* | 2/2012 | Mahapatra | F03G 7/005 29/25.35 |
| 2015/0109006 A1* | 4/2015 | Choi | G01P 3/50 264/105 |
| 2017/0229674 A1* | 8/2017 | Jin | H10K 50/8426 |
| 2017/0318360 A1* | 11/2017 | Tran | B33Y 80/00 |
| 2018/0081219 A1* | 3/2018 | Kim | H10K 59/40 |
| 2018/0095502 A1* | 4/2018 | Yamazaki | G06F 1/1618 |
| 2018/0335679 A1 | 11/2018 | Hashimoto et al. | |
| 2018/0342226 A1* | 11/2018 | Shin | G06F 1/1616 |
| 2019/0229156 A1* | 7/2019 | Jun | G06F 3/0412 |
| 2020/0026382 A1* | 1/2020 | Zhang | G06F 3/0443 |
| 2020/0081562 A1* | 3/2020 | Shi | G06F 3/0446 |
| 2020/0097128 A1* | 3/2020 | Jung | H04M 1/0216 |
| 2020/0233461 A1* | 7/2020 | Kim | G06F 1/1652 |
| 2020/0326751 A1* | 10/2020 | Kim | G06F 1/1616 |
| 2020/0335017 A1* | 10/2020 | Yao | H10K 50/844 |
| 2020/0348787 A1* | 11/2020 | Wang | G06F 3/0446 |
| 2021/0135146 A1* | 5/2021 | Kim | H10K 71/00 |
| 2021/0211530 A1* | 7/2021 | Jung | G06F 1/1681 |
| 2021/0240326 A1* | 8/2021 | Chou | G06F 3/0446 |
| 2021/0249480 A1* | 8/2021 | Hwang | G06F 3/04164 |
| 2021/0271335 A1* | 9/2021 | Kishimoto | G06F 3/0447 |
| 2021/0294379 A1* | 9/2021 | Lee | G09F 9/301 |
| 2021/0311591 A1* | 10/2021 | Hwang | G06F 3/0446 |
| 2021/0319724 A1* | 10/2021 | Jang | G06F 1/1652 |
| 2021/0357048 A1* | 11/2021 | Kishimoto | G06F 3/046 |
| 2021/0365073 A1* | 11/2021 | Cha | G06F 1/1626 |
| 2021/0365132 A1* | 11/2021 | Jung | G06F 3/03545 |
| 2022/0243096 A1* | 8/2022 | Kim | G06F 1/1616 |
| 2022/0261093 A1* | 8/2022 | Zhang | G06F 3/0338 |
| 2022/0271253 A1* | 8/2022 | Jeon | G06F 1/1652 |

* cited by examiner

DIGITIZER AND DISPLAY DEVICE INCLUDING THE SAME

This application claims priority to Korean Patent Application No. 10-2021-0007639, filed on Jan. 19, 2021, and Korean Patent Applications No. 10-2021-0041161, filed on Mar. 30, 2021, the content of which in their entirety is herein incorporated by reference.

BACKGROUND

1. Field

Embodiments of the invention relate to a digitizer and a display device including the same. More particularly, the embodiments of invention relate to a digitizer with flexible lines and a display device including the digitizer.

2. Description of the Related Art

Electronic items, such as a smart television, a mobile phone, a tablet computer, a navigation unit, a game unit, etc., are activated in response to electrical signals applied thereto. The electronic items include a sensor to sense inputs applied thereto from an outside of a display panel displaying an image. The electronic items include a variety of electrode patterns to be activated in response to the electrical signals. Areas in which the electrode patterns are activated display information or respond to signals applied thereto from the outside.

The electronic items include a display device to provide information. Recently, various types of display devices are being developed with a development of the electronic items. Various flexible display devices that are foldable or rollable, for example, are being developed. Researches are being conducted in various directions to prevent damages to components in a folding portion of the foldable display devices.

SUMMARY

Embodiments of the invention provide a digitizer capable of preventing sensing lines from being damaged in a folding area thereof.

Embodiments of the invention provide a display device including the digitizer.

An embodiment of the invention provides a digitizer in which a folding area folded with respect to an imaginary folding axis extending in a first direction, a first non-folding area, and a second non-folding area spaced apart from the first non-folding area with the folding area interposed therebetween are defined. The digitizer includes a first base layer, a second base layer disposed on the first base layer, a third base layer disposed on the second base layer, a first sensing line disposed between the first base layer and the second base layer and extending in the first direction, and a second sensing line extending in a second direction substantially perpendicular to the first direction, disposed between the second base layer and the third base layer, and including a first sub-line portion disposed in the first non-folding area, a second sub-line portion disposed in the second non-folding area, and a third sub-line portion disposed between the first sub-line portion and the second sub-line portion and corresponding to the folding area. The third sub-line portion has a fracture strain greater than a fracture strain of the first sub-line portion and the second sub-line portion.

In an embodiment, the fracture strain of the third sub-line portion may be equal to or greater than about 2 percent (%).

In an embodiment, the first sub-line portion and the second sub-line portion may include copper, and the third sub-line portion may include a conductive filler and a flexible polymer.

In an embodiment, the conductive filler may include at least one of copper, silver, and graphite.

In an embodiment, the flexible polymer may include at least one of a styrene-butadiene rubber, a butadiene rubber, a butyl rubber, a silicone rubber, and a urethane rubber.

In an embodiment, the third sub-line portion may have a resistivity greater than a resistivity of the first sub-line portion and the second sub-line portion.

In an embodiment, the third sub-line portion may have a resistivity equal to or greater than about $1.72 \times 10^{-8}$ ohm-meter ($\Omega \cdot m$) and equal to or smaller than about $1.00 \times 10^{-4}$ $\Omega \cdot m$.

In an embodiment, the third sub-line portion may have a width equal to or greater than about 3 millimeters (mm) and smaller than about 15 mm in the second direction.

In an embodiment, each of the first base layer, the second base layer, and the third base layer may include polyimide.

In an embodiment, the digitizer further may include a first adhesive layer disposed between the first base layer and the second base layer and covering the first sensing line and a second adhesive layer disposed between the second base layer and the third base layer and covering the second sensing line.

In an embodiment, the first base layer may be provided with a first opening defined therethrough in the folding area, and the first adhesive layer may be provided with a second opening defined therethrough and overlapping the first opening.

In an embodiment, the second opening is defined by an exposed surface adjacent to the folding area, and the exposed surface is disposed to be closer to the imaginary folding axis than the first sensing line is.

In an embodiment, a distance between a first area of the third base layer and a second area of the third base layer, which overlaps the first area of the third base layer, in a state in which the folding area is folded with respect to the imaginary folding axis is smaller than a distance between a first area of the first base layer and a second area of the first base layer, which overlaps the first area of the first base layer, in the state in which the folding area is folded with respect to the imaginary folding axis.

In an embodiment, the first sensing line is not disposed in the folding area, and only the third sub-line portion of the second sensing line is disposed in the folding area.

In an embodiment, the first sensing line is disposed directly on a surface of the second base layer facing the first base layer, and the second sensing line is disposed directly on a surface of the third base layer facing the second base layer.

In an embodiment, the first sensing line is disposed directly on a first surface of the second base layer facing the first base layer, and the second sensing line is disposed directly on a second surface of the second base layer opposite to the first surface of the second base layer.

An embodiment of the invention provides a display device in which a folding area folded with respect to an imaginary folding axis extending in a first direction, a first non-folding area, and a second non-folding area spaced apart from the first non-folding area with the folding area interposed therebetween are defined. The display device includes a digitizer, a display panel disposed on the digitizer, and a window disposed on the display panel. The digitizer includes a first base layer, a second base layer disposed on the first base layer, a third base layer disposed on the second base layer, a first sensing line disposed between the first base layer and the second base layer and extending in the first direction, and a second sensing line extending in a second direction substantially perpendicular to the first direction, disposed between the second base layer and the third base layer, and including a first sub-line portion disposed in the first non-folding area, a second sub-line portion disposed in the second non-folding area, and a third sub-line portion disposed between the first sub-line portion and the second sub-line portion to correspond to the folding area. The third sub-line portion has a fracture strain greater than a fracture strain of the first sub-line portion and the second sub-line portion.

In an embodiment, the third base layer is closer to the display panel than the first base layer is.

In an embodiment, the fracture strain of the third sub-line portion is equal to or greater than about 2%.

In an embodiment, the display device further includes a first adhesive layer disposed between the first base layer and the second base layer and covering the first sensing line and a second adhesive layer disposed between the second base layer and the third base layer and covering the second sensing line.

According to the above, the digitizer includes the flexible lines in the folding area. Thus, the digitizer capable of preventing the lines from being damaged due to the folding operation and the display device including the digitizer are provided.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION

Figure 1A:
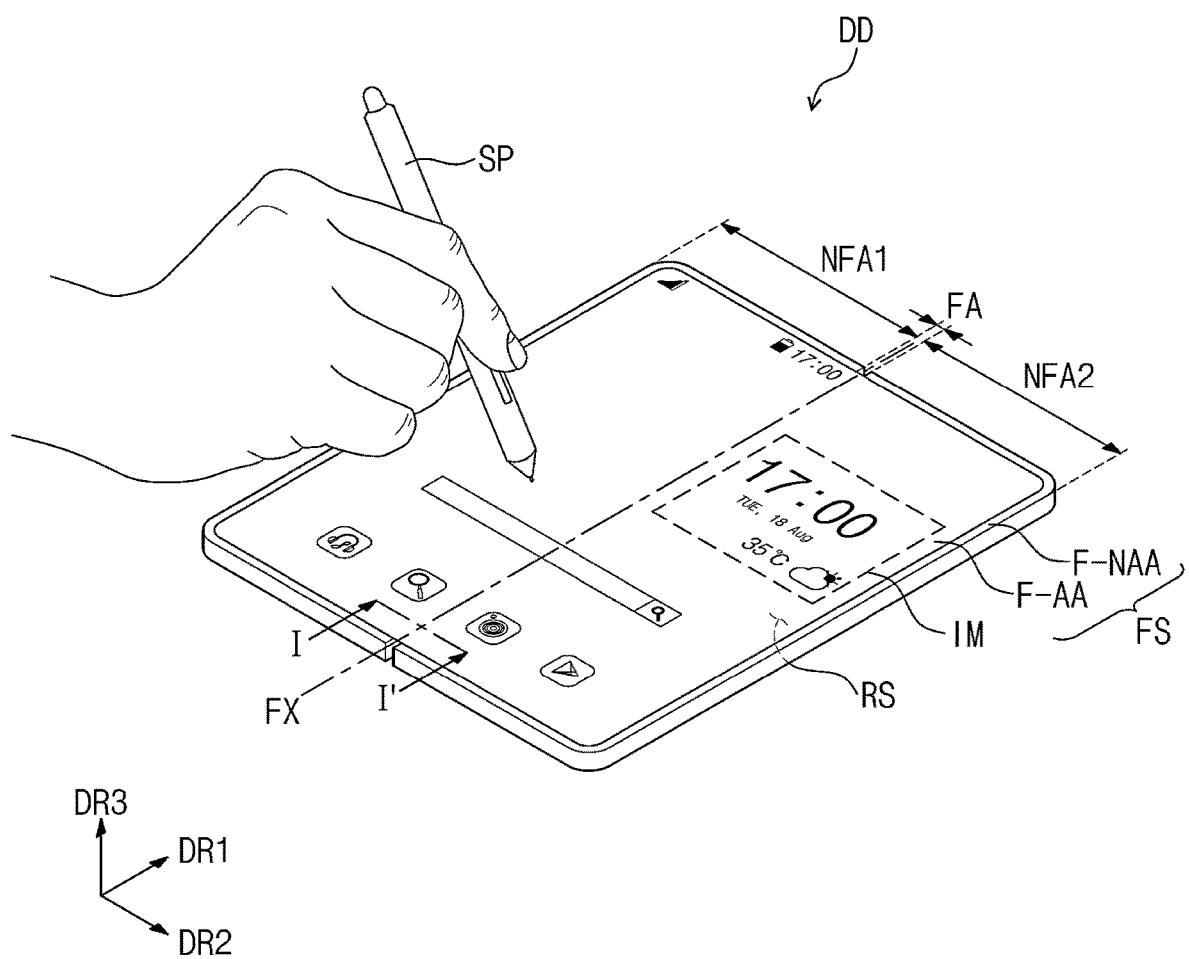
FIG. 1A is a perspective view showing an embodiment of a display device in an unfolded state according to the invention.

The disclosure may be variously modified and realized in many different forms, and thus specific embodiments will be exemplified in the drawings and described in detail hereinbelow. However, the disclosure should not be limited to the specific disclosed forms, and be construed to include all modifications, equivalents, or replacements included in the spirit and scope of the disclosure.

In the disclosure, it will be understood that when an element or layer is referred to as being "on", "connected to" or "coupled to" another element or layer, it can be directly on, connected or coupled to the other element or layer or intervening elements or layers may be present.

In the disclosure, when an element is referred to as being "directly connected" to another element, there are no intervening elements between a layer, film region, or substrate and another layer, film, region, or substrate. For example, the term "directly connected" may mean that two layers or two members are disposed without employing additional adhesive therebetween.

Like numerals refer to like elements throughout. In the drawings, the thickness, ratio, and dimension of components are exaggerated for effective description of the technical content.

As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as shown in the drawing figures.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, a digitizer and a display device including the digitizer will be explained in detail with reference to the accompanying drawings.

Figure 1B:
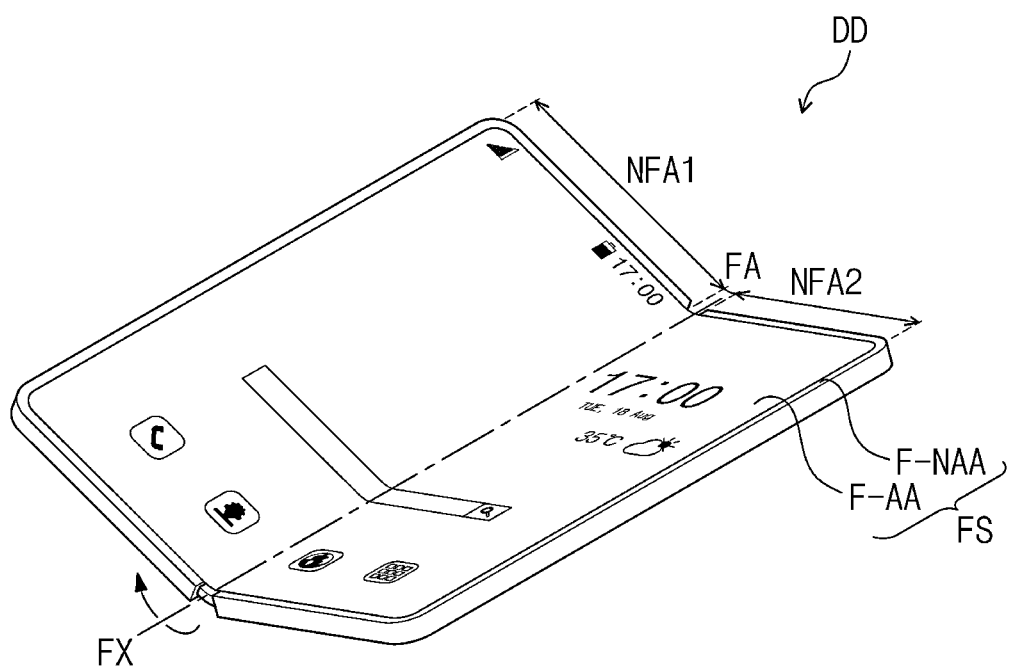
FIG. 1B is a perspective view showing an embodiment of a folding operation of a display device according to the invention.
Figure 1B:
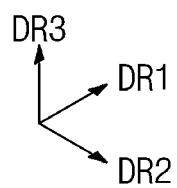
Figure 1C:
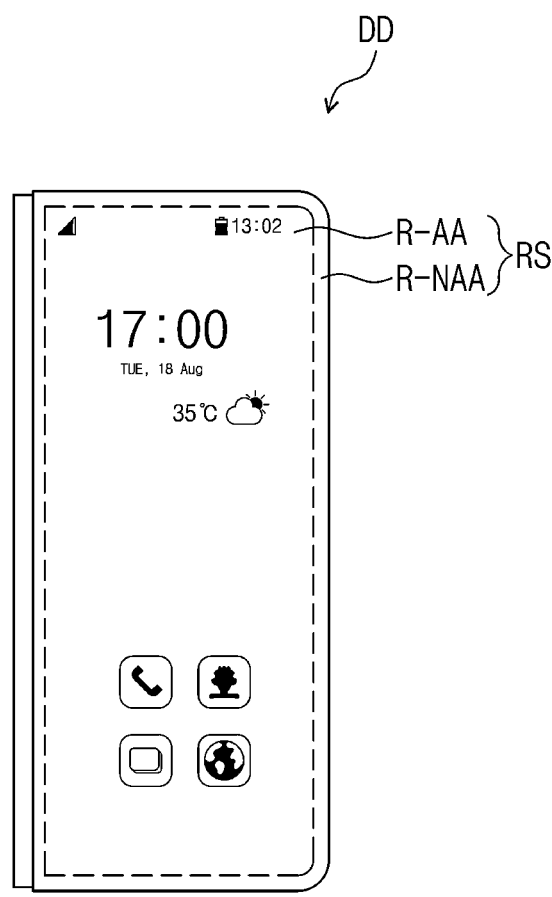
FIG. 1C is a plan view showing an embodiment of a display device in a folded state according to the invention.
Figure 1D:
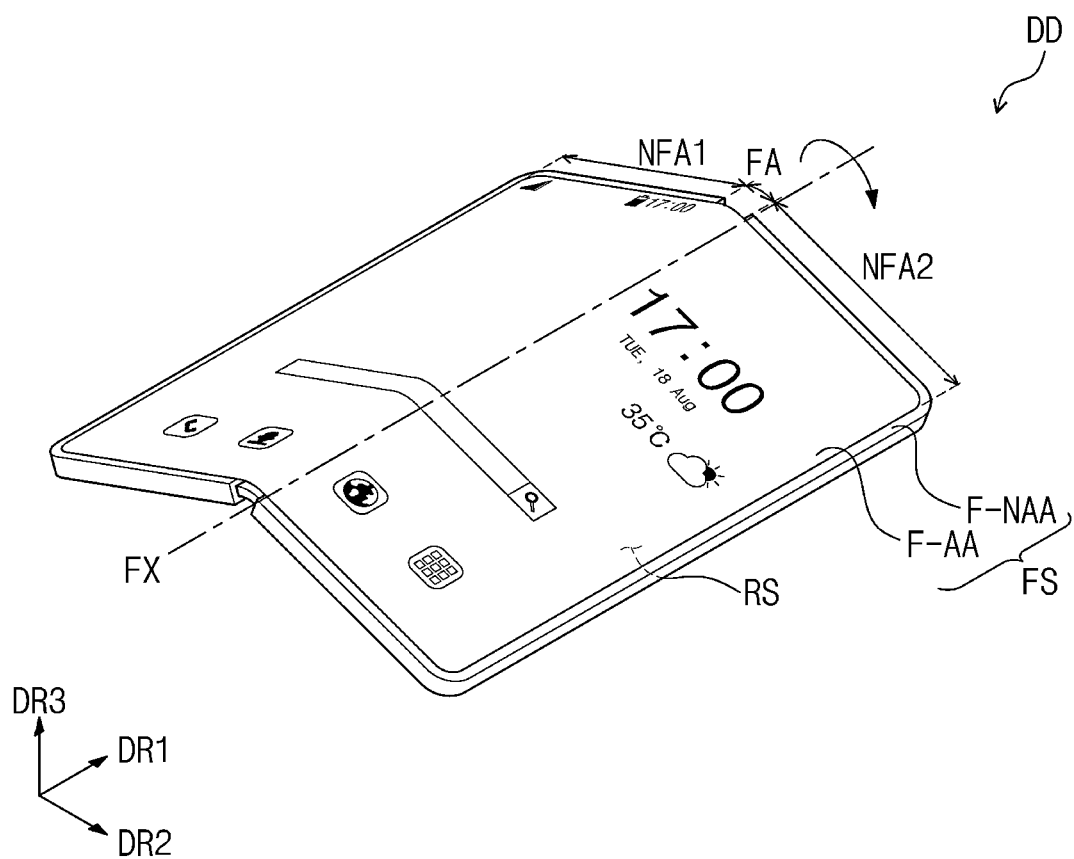
FIG. 1D is a perspective view showing an embodiment of a folding operation of a display device according to the invention.

FIG. 1A is a perspective view showing an embodiment of a display device in an unfolded state according to the invention. FIG. 1B is a perspective view showing an embodiment of a folding operation of the display device according to the invention. FIG. 1C is a plan view showing an embodiment of the display device in a folded state according to the invention. FIG. 1D is a perspective view showing an embodiment of a folding operation of the display device according to the invention.

Referring to FIG. 1A, the display device DD may be a device activated in response to an electrical signal. In the illustrated embodiment, a smartphone will be described as the display device DD. However, the invention is not limited thereto, and the display device DD may include various embodiments. In an embodiment, the display device DD may include a tablet computer, a notebook computer, a computer, or a smart television, for example.

The display device DD may include a first display surface FS that is substantially parallel to each of a first direction DR1 and a second direction DR2. The display device DD may display an image IM through the first display surface FS toward a third direction DR3. The first display surface FS through which the image IM is displayed may correspond to a front surface of the display device DD. The image IM may include a video and a still image. FIG. 1A shows an internet search box and a clock widget as an embodiment of the image IM.

In an embodiment, front (or upper) and rear (or lower) surfaces of each member of the display device DD may be defined with respect to a direction in which the image IM is displayed. The front and rear surfaces may be opposite to each other in the third direction DR3, and a normal line direction of each of the front and rear surfaces may be substantially parallel to the third direction DR3.

A distance between the front surface and the rear surface in the third direction DR3 may correspond to a thickness or a height in the third direction DR3 of the display device DD. Directions indicated by the first, second, and third directions DR1, DR2, and DR3 may be relative to each other and may be changed to other directions.

The display device DD may sense an external input applied thereto from an outside. The external input may include various forms of inputs provided from the outside of the display device DD. In an embodiment, the external inputs may include a proximity input (e.g., hovering) applied when approaching close to or adjacent to the display device DD at a predetermined distance as well as a touch input by a user's body (e.g., user's hand). In addition, the external inputs may be provided in the form of force, pressure, temperature, light, etc., for example.

FIG. 1A shows an embodiment of the external inputs applied by a pen SP of a user. The display device DD may sense the external inputs by an electromagnetic resonance ("EMR") produced between a magnetic field generated in the display device DD and the pen SP. Although not shown in drawing figures, the pen SP may be attached to or detached from an inner or outer portion of the display device DD, and the display device DD may provide or receive signals corresponding to the attachment and detachment of the pen SP.

In an embodiment, the display device DD may include the first display surface FS. The first display surface FS may include a first active area F-AA and a first peripheral area F-NAA. The first active area F-AA may be activated in response to the electrical signal. The image IM may be displayed through the first active area F-AA, and various external inputs may be sensed through the first active area F-AA. The first peripheral area F-NAA may be defined adjacent to the first active area F-AA. The first peripheral area F-NAA may have a predetermined color. The first peripheral area F-NAA may surround the first active area F-AA. Accordingly, the first active area F-AA may have a shape substantially defined by the first peripheral area F-NAA, however, this is merely one example. However, the invention is not limited thereto, and the first peripheral area F-NAA may be defined adjacent to only one side of the first active area F-AA or may be omitted.

In an embodiment, the display device DD may include at least one folding area FA and a plurality of non-folding areas NFA1 and NFA2 extending from the folding area FA. The non-folding areas NFA1 and NFA2 may be arranged in the second direction DR2 with the folding area FA interposed therebetween.

Referring to FIG. 1B, the display device DD may be folded with respect to a folding axis FX that is imaginary and extends in the first direction DR1. The display device DD may be folded about the folding axis FX to be in an in-folding state where a first non-folding area NFA1 of the first display surface FS faces a second non-folding area NFA2 of the first display surface FS.

Referring to FIG. 1C, a second display surface RS of the display device DD may be viewed by a user during the in-folding state of the display device DD. In this case, the second display surface RS may include a second active area R-AA through which the image is displayed. The second active area R-AA may be activated in response to the electrical signal. The second active area R-AA may be an area through which the image is displayed and various external inputs are sensed.

A second peripheral area R-NAA may be defined adjacent to the second active area R-AA. The second peripheral area R-NAA may have a predetermined color. The second peripheral area R-NAA may surround the second active area R-AA. In addition, although not shown in drawing figures, the second display surface RS may further include an electronic module area in which an electronic module including various components is disposed, and the second display surface RS should not be particularly limited.

Referring to FIG. 1D, the display device DD may be folded with respect to the folding axis FX to be in an out-folding state where the first non-folding area NFA1 of the second display surface RS faces the second non-folding area NFA2 of the second display surface RS.

However, the display device DD should not be limited thereto or thereby. The display device DD may be folded with respect to a plurality of folding axes such that portions of the first display surface FS face each other and portions of the second display surface RS face each other, and the number of the folding axes and the number of non-folding areas should not be particularly limited.

Figure 2:
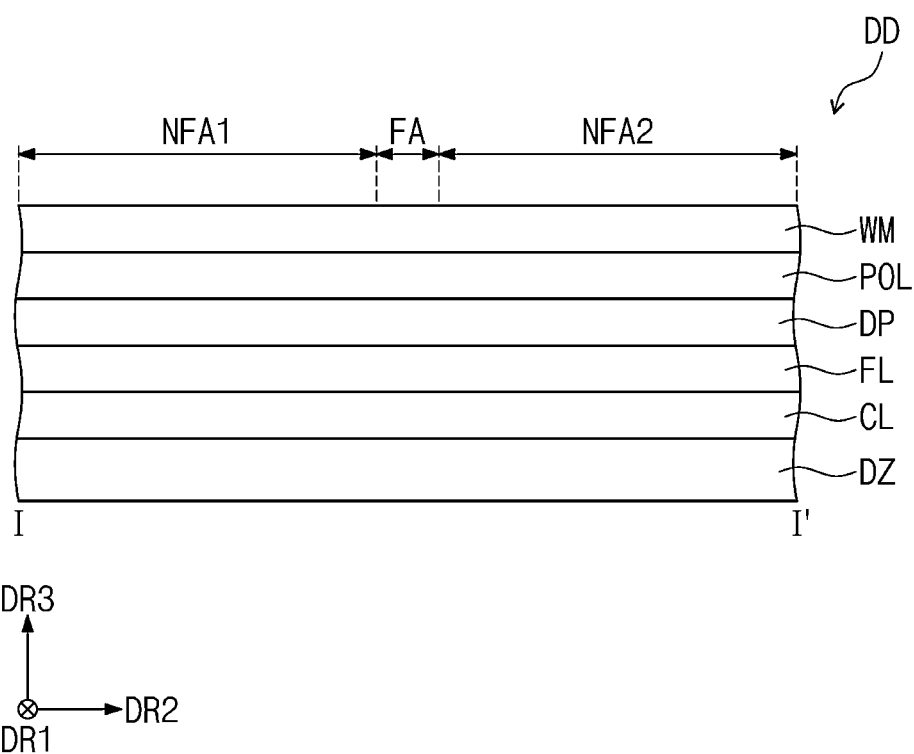
FIG. 2 is a cross-sectional view taken along line I-I' of FIG. 1A to show an embodiment of the display device according to the invention.

FIG. 2 is a cross-sectional view taken along line I-I' of FIG. 1A to show the display device DD according to the invention. Referring to FIG. 2, the display device DD may include a window WM, an optical member POL, a display panel DP, a lower film FL, a protective layer CL, and a digitizer DZ.

The window WM may be disposed on the display panel DP. The window WM may be coupled to a housing (not shown) to define an exterior of the display device DD and may protect the display panel DP.

The window WM may include a material having a high light transmittance. In an embodiment, the window WM may include a glass substrate, a sapphire substrate, or a plastic film, for example. The window WM may have a single-layer or multi-layer structure. In an embodiment, the window WM may have a stack structure of a plurality of plastic films attached to each other by an adhesive or a stack structure of the glass substrate and the plastic film attached to the glass substrate by an adhesive, for example. Although not shown in drawing figures, functional layers may be further disposed on the window WM to protect the window WM. In an embodiment, the functional layers may include at least one of an anti-fingerprint layer and an impact absorbing layer, however, they should not be particularly limited, for example.

The optical member POL may be disposed under the window WM. The optical member POL may reduce an external light reflectance of the display panel DP with respect to the light incident to the display panel DP. Although not shown in drawing figures, the optical member POL may include at least one of an anti-reflective film, a polarizing film, a color filter, and a gray filter.

The display panel DP may be disposed under the optical member POL. The display panel DP may serve as an output device. In an embodiment, the display panel DP may display the image through the active areas F-AA and R-AA (refer to FIGS. 1A and 1C), and the user may acquire information through the image, for example. In addition, the display panel DP may serve as an input device to sense the external input applied to the active areas F-AA and R-AA (refer to FIGS. 1A and 1C).

The lower film FL may be disposed under the display panel DP. The lower film FL may reduce a stress applied to the display panel DP when the display device DD is folded. In addition, the lower film FL may prevent external moisture from entering the display panel DP and may absorb external impacts.

The lower film FL may further include a functional layer formed or disposed on a plastic film. The functional layer may include a resin layer. The functional layer may be formed or provided by a coating method.

The protective layer CL may be disposed under the lower film FL. The protective layer CL may include at least one functional layer that protects the display panel DP. In an embodiment, the protective layer CL may include a light shielding layer, a heat dissipating layer, a cushion layer, and a plurality of adhesive layers, for example, however, it should not be limited thereto or thereby. That is, at least one of the light shielding layer, the heat dissipating layer, and the cushion layer may be omitted, and a plurality of layers may be provided as a single layer.

Although not shown in drawing figures, the components included in the display device DD may be coupled to each other by adhesive layers disposed between the components. Hereinafter, the adhesive layers described in the invention may be an optically clear adhesive ("OCA") film, an optically clear resin ("OCR"), or a pressure sensitive adhesive ("PSA") film. In addition, the adhesive layers may include a light-curable adhesive material or a heat-curable adhesive material, however, it should not be particularly limited.

The digitizer DZ may be disposed under the protective layer CL, however, it should not be particularly limited. The digitizer DZ may be disposed between the protective layer CL and the lower film FL or between the lower film FL and the display panel DP. The digitizer DZ may sense the signal transmitted by the pen SP (refer to FIG. 1A) among the external inputs. The digitizer DZ may sense the external inputs by an EMR method. According to the EMR method, a resonant circuit provided in the pen SP generates a magnetic field, the vibrating electric field induces signals to a plurality of lines included in the digitizer DZ, and a position of the pen SP is detected based on the signals induced to the lines. The digitizer DZ will be described in detail later.

Figure 3A:
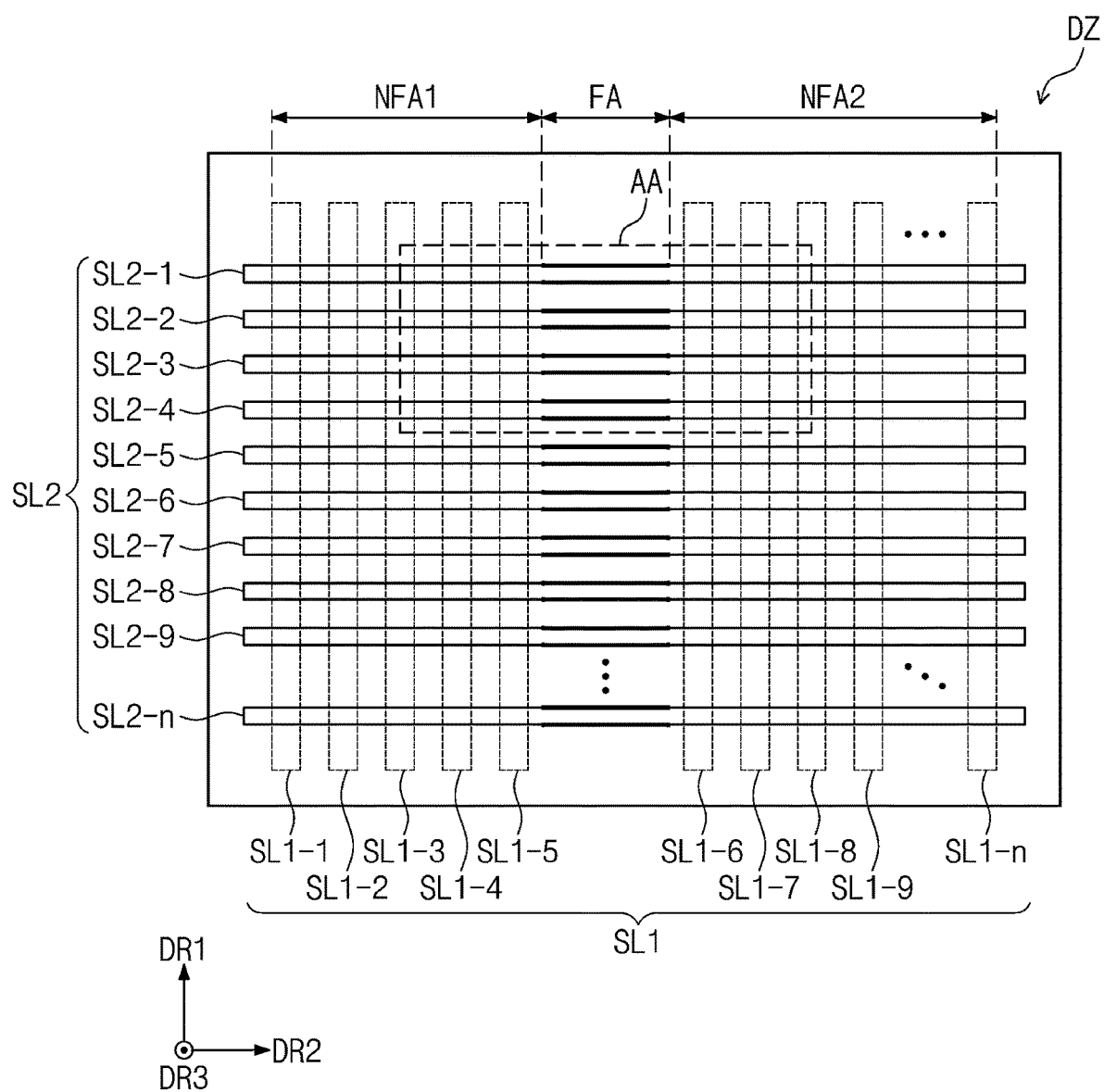
FIG. 3A is a plan view showing an embodiment of a digitizer according to the invention.
Figure 3B:
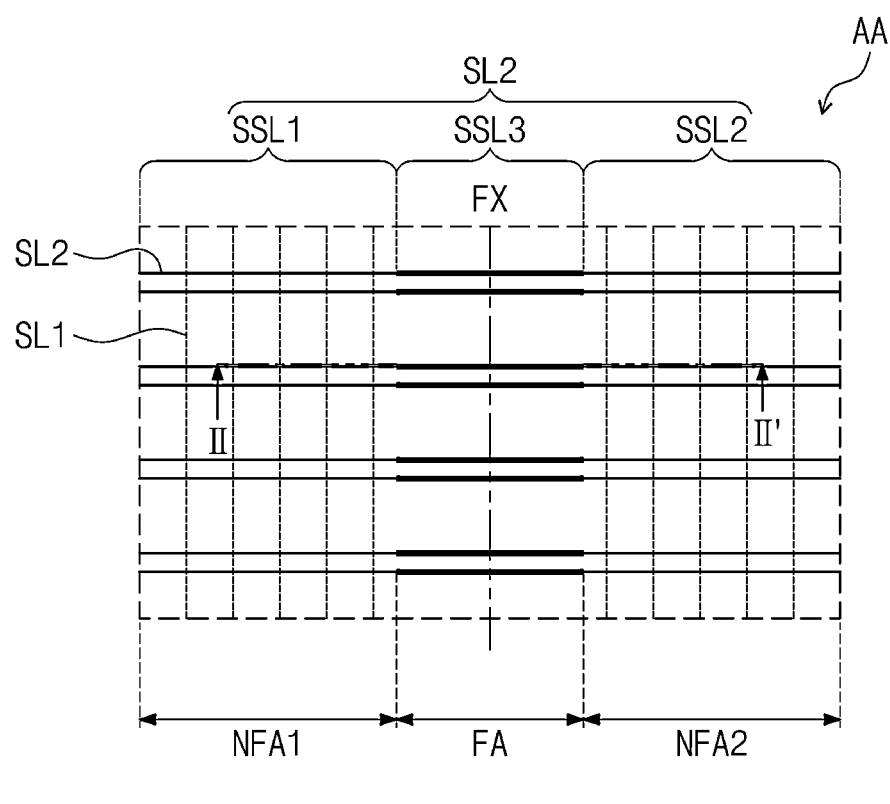
FIG. 3B is an enlarged plan view showing an embodiment of a portion AA of a digitizer according to the invention.
Figure 3B:
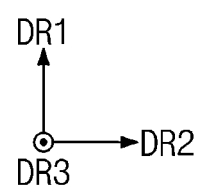
Figure 4:
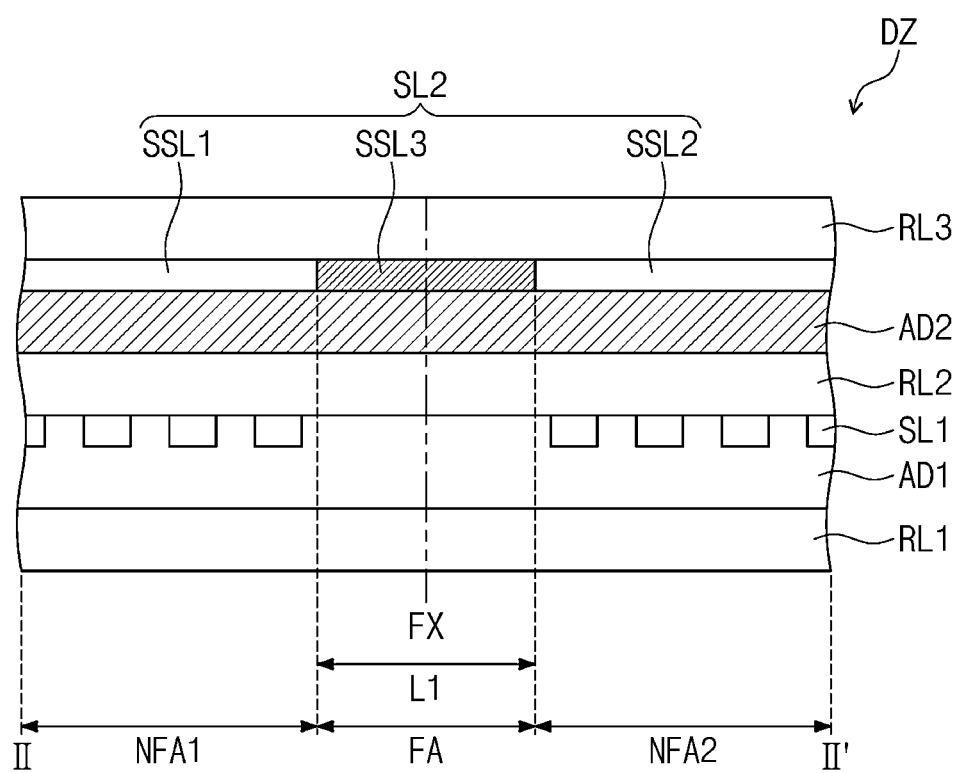
FIG. 4 is a cross-sectional view taken along line II-II' of FIG. 3B to show an embodiment of a digitizer according to the invention.

FIG. 3A is a plan view showing an embodiment of the digitizer DZ according to the invention. FIG. 3B is an enlarged plan view showing an embodiment of a portion AA of the digitizer DZ according to the invention. FIG. 4 is a cross-sectional view taken along line II-II' of FIG. 3B to show an embodiment of the digitizer DZ according to the invention.

Referring to FIGS. 3A, 3B, and 4, the digitizer DZ may include a folding area FA, a first non-folding area NFA1, and a second non-folding area NFA2, which respectively correspond to the folding area FA, the first non-folding area NFA1, and the second non-folding area NFA2 of the display device DD (refer to FIG. 1A).

In an embodiment, the digitizer DZ may include a first base layer RL1, a second base layer RL2, a third base layer RL3, a first sensing line SL1, and a second sensing line SL2.

The first base layer RL1, the second base layer RL2, and the third base layer RL3 may be sequentially stacked in a thickness direction. That is, the second base layer RL2 may be disposed above the first base layer RL1, and the third base layer RL3 may be disposed above the second base layer RL2. The third base layer RL3 may be disposed to be closer to the display panel DP (refer to FIG. 2) than the first base layer RL1 is. In an embodiment, when the digitizer DZ is folded, a distance between one area of the third base layer RL3 and the other area of the third base layer RL3, which faces the one area of the third base layer RL3, may be smaller than a distance between one area of the first base layer RL1 and the other area of the first base layer RL1, which faces the one area of the first base layer RL1, however, it should not be limited thereto or thereby. In an embodiment, when the digitizer DZ is folded, the distance between the one area of the first base layer RL1 and the other area of the first base layer RL1, which faces the one area of the first base layer RL1, may be smaller than the distance between the one area of the third base layer RL3 and the other area of the third base layer RL3, which faces the one area of the third base layer RL3.

Each of the first base layer RL1, the second base layer RL2, and the third base layer RL3 may include a polymer resin. In an embodiment, each of the first base layer RL1, the second base layer RL2, and the third base layer RL3 may include polyimide, for example.

The first sensing line SL1 may be disposed between the first base layer RL1 and the second base layer RL2. As shown in FIG. 4, the first sensing line SL1 may be disposed directly on a lower surface of the second base layer RL2, which is adjacent to the first base layer RL1.

The first sensing line SL1 may not be disposed in the folding area FA. That is, the first sensing line SL1 may be disposed only in the first non-folding area NFA1 and the second non-folding area NFA2.

The first sensing line SL1 may extend in the first direction DR1. In a plan view, one first sensing line SL1 may be formed or provided as a closed line. The closed line defined by the one first sensing line SL1 may have a quadrangular (e.g., rectangular) shape defined by long sides extending in the first direction DR1 and short sides extending in the second direction DR2, however, this is merely one example. In an embodiment, the closed line defined by the one first sensing line SL1 may have a variety of shapes. In an embodiment, the first sensing line SL1 may include first to n-th sensing line members SL1-1 to SL1-$n$ arranged in the second direction DR2, where n is a natural number.

The second sensing line SL2 may be disposed between the second base layer RL2 and the third base layer RL3. As shown in FIG. 4, the second sensing line SL2 may be disposed directly on a lower surface of the third base layer RL3, which is adjacent to the second base layer RL2.

The second sensing line SL2 may extend in the second direction DR2. In a plan view, one second sensing line SL2 may be formed or provided as a closed line. The closed line defined by the one second sensing line SL2 may have a quadrangular (e.g., rectangular) shape defined by long sides extending in the second direction DR2 and short sides extending in the first direction DR1, however, this is merely one example. In an embodiment, the closed line defined by the one second sensing line SL2 may have a variety of shapes.

The second sensing line SL2 may include a first sub-line portion SSL1 disposed in the first non-folding area NFA1, a second sub-line portion SSL2 disposed in the second non-folding area NFA2, and a third sub-line portion SSL3 disposed in the folding area FA. That is, only the third sub-line portion SSL3 of the second sensing line SL2 may be disposed in the folding area FA. In an embodiment, the second sensing line SL2 may include first to n-th sensing line members SL2-1 to SL2-$n$ arranged in the first direction DR1.

The third sub-line portion SSL3 may have different physical properties from those of the first sub-line portion SSL1 and the second sub-line portion SSL2. The first sub-line portion SSL1 and the second sub-line portion SSL2 may have a resistivity and a fracture strain, which are smaller than those of the third sub-line portion SSL3.

The first sub-line portion SSL1 and the second sub-line portion SSL2 may include copper without including a flexible conductor. The third sub-line portion SSL3 may include the flexible conductor. The flexible conductor may include a conductive filler and a flexible polymer. As the third sub-line portion SSL3 includes the conductive filler, the third sub-line portion SSL3 may have an electrical conductivity, and as the third sub-line portion SSL3 includes the flexible polymer, the third sub-line portion SSL3 may have an elasticity. The conductive filler may include at least one of copper, silver, and graphite. The flexible polymer may include at least one of a styrene-butadiene rubber, a butadiene rubber, a butyl rubber, a silicone rubber, and a urethane rubber.

The third sub-line portion SSL3 may have a physical property that varies depending on the weight proportion of the conductive filler to the flexible polymer. As the weight proportion of the conductive filler increases, the resistivity in the third sub-line portion SSL3 may increase, and the fracture strain in the third sub-line portion SSL3 may decrease. As the weight proportion of the flexible polymer increases, the resistivity in the third sub-line portion SSL3 may decrease, and the fracture strain in the third sub-line portion SSL3 may increase. The weight proportion of the conductive filler and the flexible polymer may be controlled to have small resistivity and large fracture strain so that the external input is sensed and the second sensing line SL2 is prevented from being damaged due to the folding operation.

The fracture strain of the third sub-line portion SSL3 may be smaller than the fracture strain of the first sub-line portion SSL1 and the second sub-line portion SSL2. The fracture strain of the first to third sub-line portions SSL1, SSL2, and SSL3 may be determined by the weight proportion of the conductive filler and the flexible polymer. In an embodiment, the fracture strain of the third sub-line portion SSL3 may be equal to or greater than about 2 percent (%). In a case where the fracture strain of the third sub-line portion SSL3 is smaller than about 2%, damages on the second sensing line SL2 may not be prevented due to lack of elasticity when the digitizer DZ is folded.

The resistivity of the third sub-line portion SSL3 may be greater than the resistivity of the first sub-line portion SSL1 and the second sub-line portion SSL2. In an embodiment, the resistivity of the third sub-line portion SSL3 may be equal to or greater than about $1.72 \times 10^{-8}$ ohm-meter ($\Omega \cdot m$) and equal to or smaller than about $1.00 \times 10^{-4}$ $\Omega \cdot m$. The resistivity of the first to third sub-line portions SSL1, SSL2, and SSL3 may be determined by the weight proportion of the conductive filler and the flexible polymer. As the weight proportion of the conductive filler increases and the weight proportion of the flexible polymer decreases, the resistivity may decrease, and as the weight proportion of the flexible polymer increases and the weight proportion of the conductive filler decreases, the resistivity may increase. In a case where the resistivity is smaller than about $1.72 \times 10^{-8}$ $\Omega \cdot m$, the weight proportion of the flexible polymer decreases, and thus, the third sub-line portion SSL3 may not have the elasticity sufficient to prevent the line from being damaged, and in a case where the resistivity is greater than about $1.00 \times 10^{-4}$ $\Omega \cdot m$, the electrical conductivity may decrease, and thus, external input may not be sensed.

In an embodiment, the third sub-line portion SSL3 may have a width L1 equal to or greater than about 3 millimeters (mm) and smaller than about 15 mm in the second direction DR2. In a case where the width L1 in the second direction DR2 of the third sub-line portion SSL3 is smaller than about 3 mm, the elasticity of the second sensing line SL2 may be lacked, and thus, the damage to the second sensing line SL2 caused by the folding operation may not be prevented, and in a case where the width L1 is equal to or greater than about 15 mm, the electrical conductivity of the second sensing line SL2 may be reduced, and thus, the external input may not be sensed.

The first sensing line SL1 and the second sensing line SL2 may cross and overlap each other in the first and second non-folding areas NFA1 and NFA2. The first sensing line SL1 may be a plurality of first sensing lines SL1, and the second sensing line SL2 may be a plurality of second sensing lines SL2. Each of the first sensing lines SL1 may cross and overlap all second sensing lines SL2 in the first and second non-folding areas NFA1 and NFA2, and each of the second sensing lines SL2 may cross and overlap all first sensing lines SL1 in the first and second non-folding areas NFA1 and NFA2.

In an embodiment, the digitizer DZ may further include a first adhesive layer AD1 disposed between the first base layer RL1 and the second base layer RL2 to cover the first sensing line SL1 and a second adhesive layer AD2 disposed between the second base layer RL2 and the third base layer RL3 to cover the second sensing line SL2, however, this is merely one example. In an embodiment, the second base layer RL2 may be disposed directly on the first base layer RL1, and the third base layer RL3 may be disposed directly on the second base layer RL2.

Figure 5:
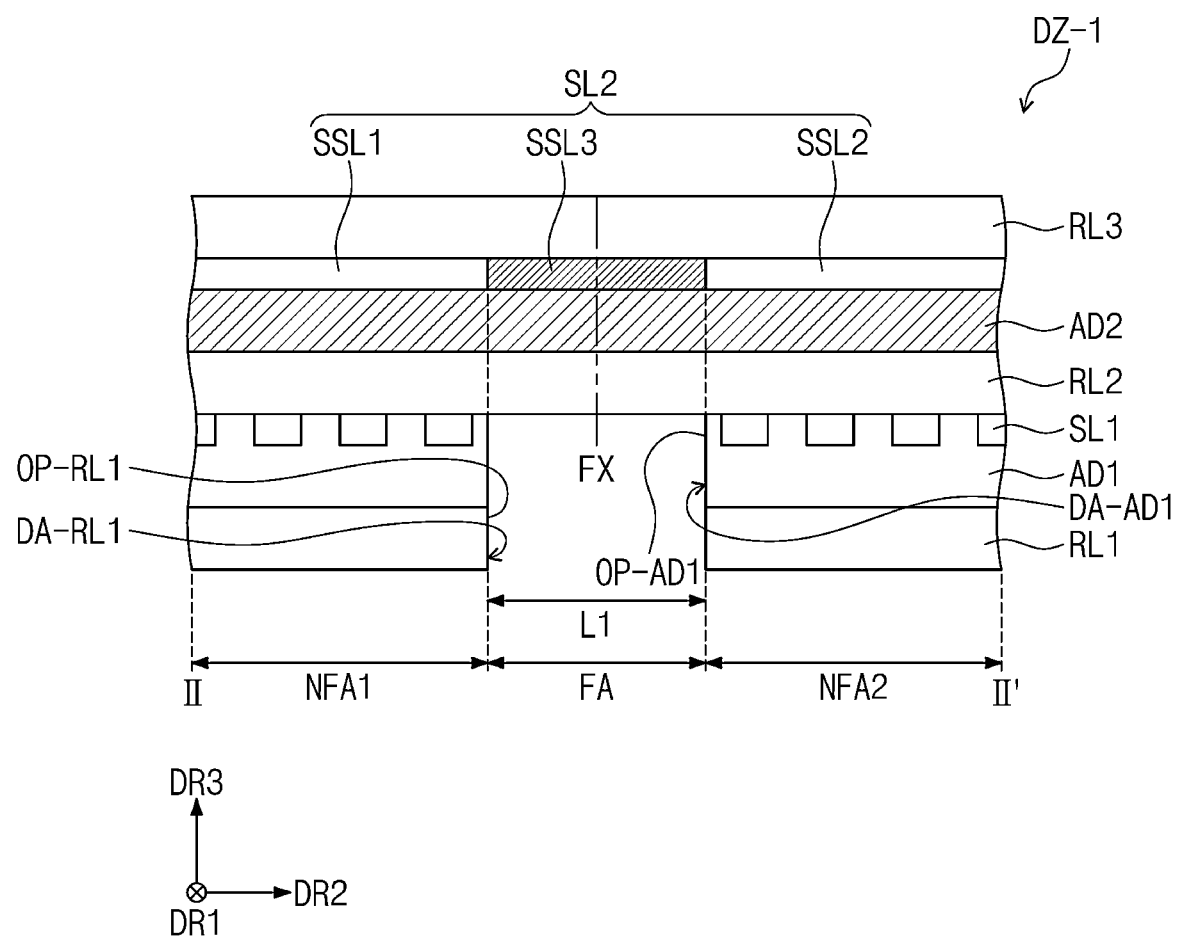
FIG. 5 is a cross-sectional view taken along line II-II' of FIG. 3B to show an embodiment of a digitizer according to the invention.

FIG. 5 is a cross-sectional view showing a digitizer DZ-1 according to the invention. The digitizer DZ-1 shown in FIG. 5 may correspond to a cross-section taken along line II-II' of FIG. 3B. Hereinafter, the digitizer DZ-1 will be described in detail with reference to FIG. 5. In FIG. 5, descriptions on the same elements as those in FIGS. 1A, 1B, 2, 3A, 3B, and 4 will be omitted, and different features will be mainly described.

Different from the digitizer DZ described with reference to FIGS. 1A to 4, the digitizer DZ-1 shown in FIG. 5 may include a first base layer RL1 provided with a first opening OP-RL1 defined therethrough in a folding area FA.

Referring to FIG. 5, the digitizer DZ-1 may include the first base layer RL1 provided with the first opening OP-RL1 defined therethrough in the folding area FA. The first opening OP-RL1 may be defined by an exposed surface DA-RL1 of the first base layer RL1 and a second base layer RL2. As the first opening OP-RL1 is defined through the first base layer RL1 in the folding area FA, a thickness of the folding area FA may be reduced, and the digitizer DZ-1 may be easily folded.

In an embodiment, the digitizer DZ-1 may further include a first adhesive layer AD1 disposed between the first base layer RL1 and the second base layer RL2. The first adhesive layer AD1 may be provided with a second opening OP-AD1 defined therethrough to overlap the first opening OP-RL1. The second opening OP-AD1 may be defined by an exposed surface DA-AD1 of the first adhesive layer AD1 and the second base layer RL2. The exposed surface of the first adhesive layer AD1 may be disposed to be closer to a folding axis FX than the first sensing line SL1 is.

Figure 6:
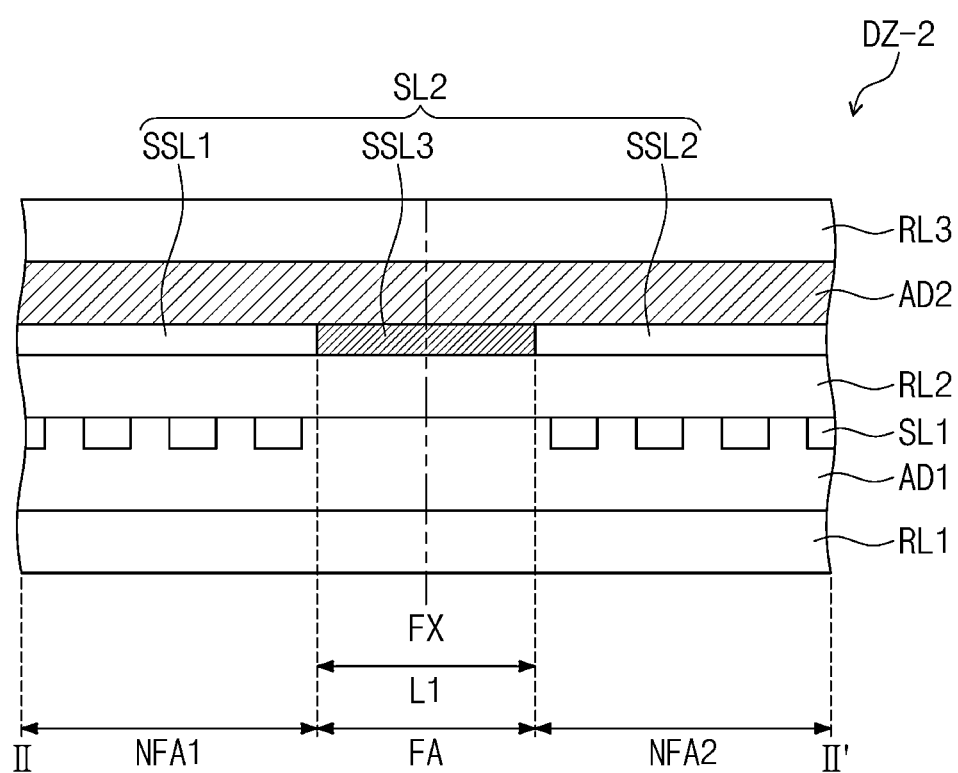
FIG. 6 is a cross-sectional view taken along line II-II' of FIG. 3B to show an embodiment of a digitizer according to the invention.

FIG. 6 is a cross-sectional view showing a digitizer DZ-2. The digitizer DZ-2 shown in FIG. 6 may correspond to a cross-section taken along line II-II' of FIG. 3B. Hereinafter, the digitizer DZ-2 will be described in detail with reference to FIG. 6. In FIG. 6, descriptions on the same elements as those in FIGS. 1A, 1B, 2, 3A, 3B, and 4 will be omitted, and different features will be mainly described.

Different from the digitizer DZ described with reference to FIGS. 1A to 4, the digitizer DZ-2 shown in FIG. 6 may include a second sensing line SL2 disposed on an upper surface of a second base layer RL2.

Referring to FIG. 6, the digitizer DZ-2 may include a first sensing line SL1 disposed on a lower surface of the second base layer RL2 and the second sensing line SL2 disposed on the upper surface of the second base layer RL2. In an embodiment, the digitizer DZ-2 may further include a second adhesive layer AD2 disposed on the second sensing line SL2 to cover the second sensing line SL2. The second adhesive layer AD2 may be disposed to be closer to a third base layer RL3 than the second sensing line SL2 is.

Hereinafter, the invention will be described in more detail through predetermined embodiment examples and comparison examples. The following embodiment examples are merely one example to aid understanding of the invention, and the invention should not be limited thereto or thereby.

The following Table 1 shows configurations of digitizers in comparison examples and embodiment examples. In the following Table 1, Ex1 to Ex4 respectively denote embodiment example 1 to embodiment example 4, and Cx1 and Cx2 respectively denote comparison example 1 and comparison example 2. Further, N1SL denotes "Non-folding area First sensing line", F1SL denotes "Folding area First sensing line", N2SL denotes "Non-folding area Second sensing line", F2SL denotes "Folding area Second sensing line", FL2SL denotes "Folding area Length of second sensing line", and FBL denotes "Folding portion Base layer". Also, CCLs denotes copper clad laminates. O and X in Table 1 indicate the presence or absence of the folding base layer.

TABLE 1

| | | Ex1 | Ex2 | Ex3 | Ex4 | Cx1 | Cx2 |
|---|---|---|---|---|---|---|---|
| Config- uration | Stack structure | Two single-sided CCLs | | Double-sided CCL | | Two single-sided CCLs | |
| | N1SL | | | Cu | | | |
| | F1SL | | | X | | | |
| | N2SL | Cu | | | | Flexible conductor | Cu |
| | F2SL | | | Flexible conductor | | | |
| | FL2SL | 13 mm | | | | Applied to entire width | 15 mm |
| | FBL | O | X | O | X | O | O |

In Table 1, the two single-sided CCLs among items of the stack structure means a single-sided CCL structure in which a sensing line is disposed only on one surface of the base layer, and the double-sided CCL among the items of the stack structure means a double-sided CCL structure in which the sensing line is disposed on both surfaces of the base layer. In Table 1, the flexible conductor includes at least one of copper, silver, and graphite as the conductive filler and includes at least one of a styrene-butadiene rubber, a butadiene rubber, a butyl rubber, a silicone rubber, and a urethane rubber as the flexible polymer, and thus, the flexible conductor means the material that allows the fracture strain to be equal to or greater than about 2% and the resistivity to be equal to or greater than about $1.72 \times 10^{-8}$ Ω·m and smaller than about $1.00 \times 10^{-4}$ Ω·m.

The stack structure of the digitizer according to embodiment example 1, embodiment example 2, comparison example 1, and comparison example 2 is the single-sided CCL structure in which the first sensing line and the second sensing line are respectively disposed on two base layers as shown in FIG. 4, and the stack structure of the digitizer according to embodiment example 3 and embodiment example 4 is the double-sided CCL structure in which the first sensing line is disposed on one surface of one base layer and the second sensing line is disposed on the other surface opposite to the one surface of the base layer on which the first sensing line is disposed as shown in FIG. 6.

In the configurations of the embodiment examples and the comparison examples, there is no difference in the first sensing line, but there is a difference in the second sensing line. The second sensing line in the embodiment examples includes the line portion that is disposed in the non-folding area, includes copper, and does not include the flexible polymer and the line portion that is disposed in the folding area and includes the conductive filler and the flexible polymer, and the width in horizontal direction of the folding area of the second sensing line is about 13 mm. In comparison, comparison example 1 includes the second sensing line that includes the line portion including the conductive filler and the flexible polymer in both the folding area and the non-folding area, and comparison example 2 is different from the embodiment examples in that a width in horizontal direction of the folding area of the second sensing line is about 15 mm.

The following Table 2 shows a minimum number of folding times that causes damages to the second sensing line and whether the pen is sensed according to comparison examples and embodiment examples. The minimum number of folding times at which the second sensing line is damaged is the number of times of the folding operation measured at the time when the second sensing line is damaged after repeating the folding operation. Whether the pen is sensed is obtained by evaluating whether the display device senses the external input based on the resonance caused by the electromagnetic induction using an electromagnetic pen. In the following Table 2, MINF represents "Minimum number of folding times that causes damages to the second sensing line".

TABLE 2

|  |  | Ex1 | Ex2 | Ex3 | Ex4 | Cx1 | Cx2 |
|---|---|---|---|---|---|---|---|
| Evaluation | MINF | 200,000 times | 300,000 times | 100,000 times | 200,000 times | 200,000 times | 200,000 times |
|  | Pen sensing | O | O | O | O | X | X |

When comparing the embodiment examples with the comparison examples, it is observed that the external input is not sensed due to the lack of the electrical conductivity in a case where the flexible conductor having the electrical conductivity lower than that of copper is disposed to have a thickness of about 15 mm or more. In addition, since comparison example 1 and comparison example 2 have superior elasticity than that of embodiment example 3, comparison example 1 and comparison example 2 have superior folding characteristics, however, it is observed that the pen sensing is impossible due to insufficient electrical conductivity in comparison example 1 and comparison example 2. Accordingly, it is observed that embodiment examples have superior folding characteristics together with superior pen sensing characteristics when compared with the comparison examples.

Since embodiment example 2 has the minimum number of folding times at which the second sensing line is damaged that is greater than that of embodiment example 1, it is observed that reducing the thickness of the folding area by defining the opening through the base layer in the folding area as shown in FIG. 5 more effectively prevents the damage to the line due to the folding operation.

When comparing embodiment examples 1 and 2 with embodiment examples 3 and 4, since the minimum number of folding times at which the second sensing line is damaged in the single-sided CCL structure is greater than that in the double-sided CCL structure, it is observed that the damage of the line due to the folding operation is reduced when the single-sided CCL structure is employed.

In an embodiment, as the digitizer includes the first sensing line substantially parallel to the folding axis and disposed only in the non-folding area and the second sensing line including the first sub-line portion and the second sub-line portion disposed in the non-folding area and the third sub-line portion disposed in the folding area and having the fracture strain greater than the fracture strain of the first sub-line portion and the second sub-line portion and substantially perpendicular to the folding axis, the damage of the line due to the folding operation may be reduced in the digitizer.

In an embodiment, as the display device includes the digitizer including the line with superior elasticity and high electrical conductivity, the display device may receive the input by the pen without damaging the line of the digitizer.

Although the embodiments of the invention have been described, it is understood that the invention should not be limited to these embodiments but various changes and modifications may be made by one ordinary skilled in the art within the spirit and scope of the invention.

Therefore, the disclosed subject matter should not be limited to any single embodiment described herein, and the scope of the invention shall be determined according to the attached claims.

What is claimed is:

1. A digitizer in which a folding area folded with respect to an imaginary folding axis extending in a first direction, a first non-folding area, and a second non-folding area spaced apart from the first non-folding area with the folding area interposed therebetween are defined, the display device comprising:
    a first base layer;
    a second base layer disposed on the first base layer;
    a third base layer disposed on the second base layer;
    a first sensing line disposed between the first base layer and the second base layer and extending in the first direction; and
    a second sensing line extending in a second direction substantially perpendicular to the first direction, disposed between the second base layer and the third base layer, and comprising:
        a first sub-line portion disposed in the first non-folding area;
        a second sub-line portion disposed in the second non-folding area; and
        a third sub-line portion disposed between the first sub-line portion and the second sub-line portion and corresponding to the folding area,
    wherein the third sub-line portion has a fracture strain greater than a fracture strain of the first sub-line portion and the second sub-line portion.

2. The digitizer of claim 1, wherein the fracture strain of the third sub-line portion is equal to or greater than about 2 percent.

3. The digitizer of claim 1, wherein the first sub-line portion and the second sub-line portion comprise copper, and the third sub-line portion comprises a conductive filler and a flexible polymer.

4. The digitizer of claim 3, wherein the conductive filler comprises at least one of copper, silver, and graphite.

5. The digitizer of claim 4, wherein the flexible polymer comprises at least one of a styrene-butadiene rubber, a butadiene rubber, a butyl rubber, a silicone rubber, and a urethane rubber.

6. The digitizer of claim 1, wherein the third sub-line portion has a resistivity greater than a resistivity of the first sub-line portion and the second sub-line portion.

7. The digitizer of claim 1, wherein the third sub-line portion has a resistivity equal to or greater than about $1.72 \times 10^{-8}$ ohm-meter and equal to or smaller than about $1.00 \times 10^{-4}$ ohm-meter.

8. The digitizer of claim 1, wherein the third sub-line portion has a width equal to or greater than about 3 millimeters and smaller than about 15 millimeters in the second direction.

9. The digitizer of claim 1, wherein each of the first base layer, the second base layer, and the third base layer comprises polyimide.

10. The digitizer of claim 1, further comprising:
    a first adhesive layer disposed between the first base layer and the second base layer and covering the first sensing line; and
    a second adhesive layer disposed between the second base layer and the third base layer and covering the second sensing line.

11. The digitizer of claim 10, wherein the first base layer is provided with a first opening defined therethrough in the folding area, and the first adhesive layer is provided with a second opening defined therethrough and overlapping the first opening.

12. The digitizer of claim 11, wherein the second opening is defined by an exposed surface adjacent to the folding area, and the exposed surface is closer to the imaginary folding axis than the first sensing line is.

13. The digitizer of claim 1, wherein a distance between a first area of the third base layer and a second area of the third base layer, which overlaps the first area of the third base layer, in a state in which the folding area is folded with respect to the imaginary folding axis is smaller than a distance between a first area of the first base layer and a second area of the first base layer, which overlaps the first area of the first base layer, in the state in which the folding area is folded with respect to the imaginary folding axis.

14. The digitizer of claim 1, wherein the first sensing line is not disposed in the folding area, and only the third sub-line portion of the second sensing line is disposed in the folding area.

15. The digitizer of claim 1, wherein the first sensing line is disposed directly on a surface of the second base layer facing the first base layer, and the second sensing line is disposed directly on a surface of the third base layer facing the second base layer.

16. The digitizer of claim 1, wherein the first sensing line is disposed directly on a first surface of the second base layer facing the first base layer, and the second sensing line is disposed directly on a second surface of the second base layer opposite to the first surface of the second base layer.

17. A display device in which a folding area folded with respect to an imaginary folding axis extending in a first direction, a first non-folding area, and a second non-folding area spaced apart from the first non-folding area with the folding area interposed therebetween are defined, the display device comprising:
    a digitizer;
    a display panel disposed on the digitizer; and
    a window disposed on the display panel, the digitizer comprising:
        a first base layer;
        a second base layer disposed on the first base layer;
        a third base layer disposed on the second base layer;
        a first sensing line disposed between the first base layer and the second base layer and extending in the first direction; and
        a second sensing line extending in a second direction substantially perpendicular to the first direction, disposed between the second base layer and the third base layer, and comprising:
            a first sub-line portion disposed in the first non-folding area;
            a second sub-line portion disposed in the second non-folding area; and
            a third sub-line portion disposed between the first sub-line portion and the second sub-line portion to correspond to the folding area,
    wherein the third sub-line portion has a fracture strain greater than a fracture strain of the first sub-line portion and the second sub-line portion.

18. The display device of claim 17, wherein the third base layer is closer to the display panel than the first base layer is.

19. The display device of claim 17, wherein the fracture strain of the third sub-line portion is equal to or greater than about 2 percent.

20. The display device of claim 17, further comprising:
    a first adhesive layer disposed between the first base layer and the second base layer and covering the first sensing line; and
    a second adhesive layer disposed between the second base layer and the third base layer and covering the second sensing line.

* * * * *